(12) United States Patent
Hsu

(10) Patent No.: US 6,427,431 B1
(45) Date of Patent: Aug. 6, 2002

(54) LAWN RAKE HAVING REPLACEMENT TINES

(76) Inventor: Shih Hao Hsu, P.O. Box 63-99, Taichung (TW), 406

( * ) Notice: Subject to any disclaimer, the term of this patent is extended or adjusted under 35 U.S.C. 154(b) by 0 days.

(21) Appl. No.: 09/636,032

(22) Filed: Aug. 8, 2000

(51) Int. Cl.$^7$ ................................................. A01D 7/06
(52) U.S. Cl. ................................. 56/400.17; 56/400.21
(58) Field of Search ........................ 56/400.01, 400.04, 56/400.16, 400.17, 400.18, 400.19, 400.2, 400.21

(56) References Cited

U.S. PATENT DOCUMENTS

| | | | | |
|---|---|---|---|---|
| 2,529,025 A | * | 11/1950 | Kaufman ................. | 56/400.17 |
| 2,746,235 A | * | 5/1956 | Kautenberg ............. | 56/400.17 |
| 4,173,835 A | | 11/1979 | Burrell ..................... | 37/53 |
| 4,215,528 A | * | 8/1980 | Fodor ...................... | 56/400.17 |
| 4,376,367 A | * | 3/1983 | Rocquin .................. | 56/400.17 |
| 4,573,311 A | * | 3/1986 | Ipema et al. ............. | 56/400.17 |
| 4,649,698 A | * | 3/1987 | Sykora ..................... | 56/400.17 |
| 4,744,208 A | * | 5/1988 | King ........................ | 56/400.16 |
| 5,022,221 A | * | 6/1991 | Bonnes et al. ........... | 56/400.17 |
| 5,033,261 A | * | 7/1991 | Bonnes et al. ........... | 56/400.17 |
| 5,177,947 A | * | 1/1993 | Sun .......................... | 56/400.17 |
| 5,572,858 A | * | 11/1996 | Sun .......................... | 56/400.17 |

* cited by examiner

Primary Examiner—Thomas B. Will
Assistant Examiner—Nathan Mammen

(57) ABSTRACT

A lawn rake includes a number of tines attached onto a rake member, and a single presser bar disposed across the tines and secured to the rake member for easily and quickly securing the tines to the rake member. A number of seats are formed on the rake member, the presser bar is engaged through the seats. The rake member has one or more spring latches engaged with the presser bar for securing the presser bar to the rake member. The tines each includes a bent end engaged into the rake member for being solidly secured to the rake member.

12 Claims, 8 Drawing Sheets

LAWN RAKE HAVING REPLACEMENT TINES

BACKGROUND OF THE INVENTION

1. Field of the Invention

The present invention relates to a rake, and more particularly to a lawn rake having replacement tines.

2. Description of the Prior Art

Various kinds of lawn rakes have been developed and used today. U.S. Pat. No. 4,173,835 to Burrell, U.S. Pat. No. 4,215,528 to Fodor, U.S. Pat. No. 5,022,221 to Bonnes et al., and U.S. Pat. No. 5,177,947 to Sun, disclose several kinds of the typical lawn rakes which all include the tines that may not be easily changed or replaced with the other ones. In addition, a number of spring anchoring devices are required to be engaged in the rake body for securing the tines in the rake body respectively.

U.S. Pat. No. 5,033,261 to Bonnes et al. discloses a typical lawn rake having replacement tines. The tines of the same shape and size, or the identical tines may be replaced or changed with each other. However, similarly, a number of spring anchoring devices are required to be engaged in the rake body for securing the tines in the rake body respectively. The tines may not be easily and quickly assembled or disassembled.

The present invention has arisen to mitigate and/or obviate the afore-described disadvantages of the conventional rakes.

SUMMARY OF THE INVENTION

The primary objective of the present invention is to provide a lawn rake including a rake body for changeably or replaceably attaching various kinds of tines of different shapes or sizes.

The other objective of the present invention is to provide a lawn rake including a number of tines that may be easily and quickly secured onto a rake body with a single presser bar.

In accordance with one aspect of the invention, there is provided a lawn rake comprising a rake body, a number of tines attached onto or engaged through the rake body, a presser bar disposed across the tines for securing the tines to the rake body, and securing means for securing the presser bar to the rake body. The tines may be easily and quickly secured to the rake body with the single presser bar, such that the tines may be easily and quickly changed or replaced with the other ones.

The securing means includes a number of seats provided on the rake body, the presser bar is engaged through the seats and secured to the rake body with the seats. The seats each includes a channel or an orifice formed therein for receiving the presser bar. The securing means includes one or more spring latches engaged with the presser bar, particularly for engaging with the ends of the presser bar, and for securing the presser bar to the rake body.

The rake body includes a number of cavities formed therein, the tines each includes a bent end engaged into the cavities of the rake body for being solidly secured to the rake body. The rake body includes a number of blocks formed therein for defining the cavities thereof respectively.

The rake body includes a number of stops provided thereon, the tines are engaged through the stops respectively. The rake body includes a number of slots formed therein for receiving the tines, the stops are straddled over the slots of the rake body respectively, and each includes a channel formed therein and communicating with the slot of the rake body respectively for receiving the tines of various kinds of shapes or size and for allowing the tines to be engaged through the stops of the rake body.

The rake body includes a number of bulges provided thereon and having a groove formed therein, the tines each includes a twisted end portion engaged through the grooves of the bulges respectively, for allowing the tines to be secured to the rake body.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
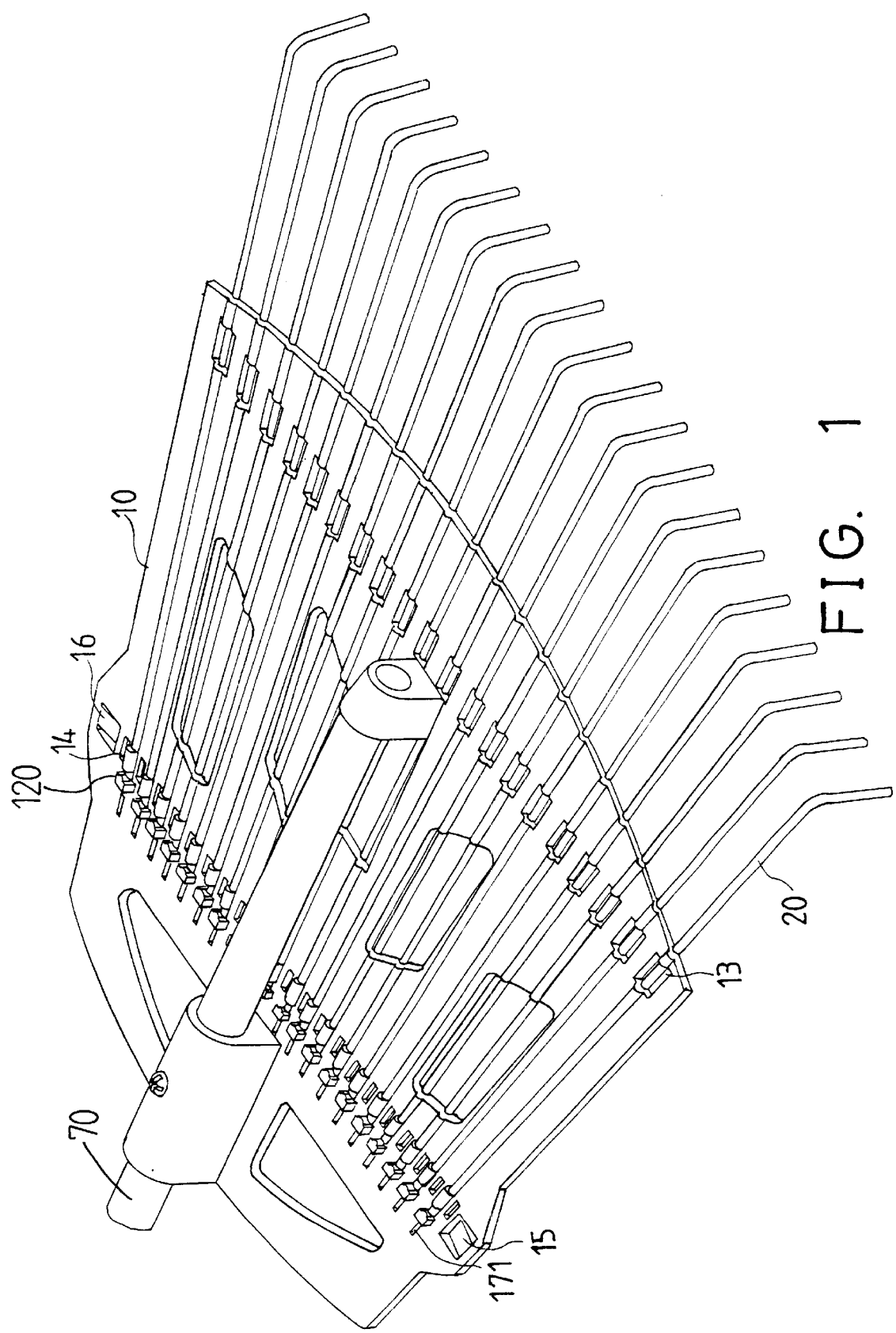
FIG. 1 is an upper perspective view of a lawn rake in accordance with the present invention.
Figure 2:
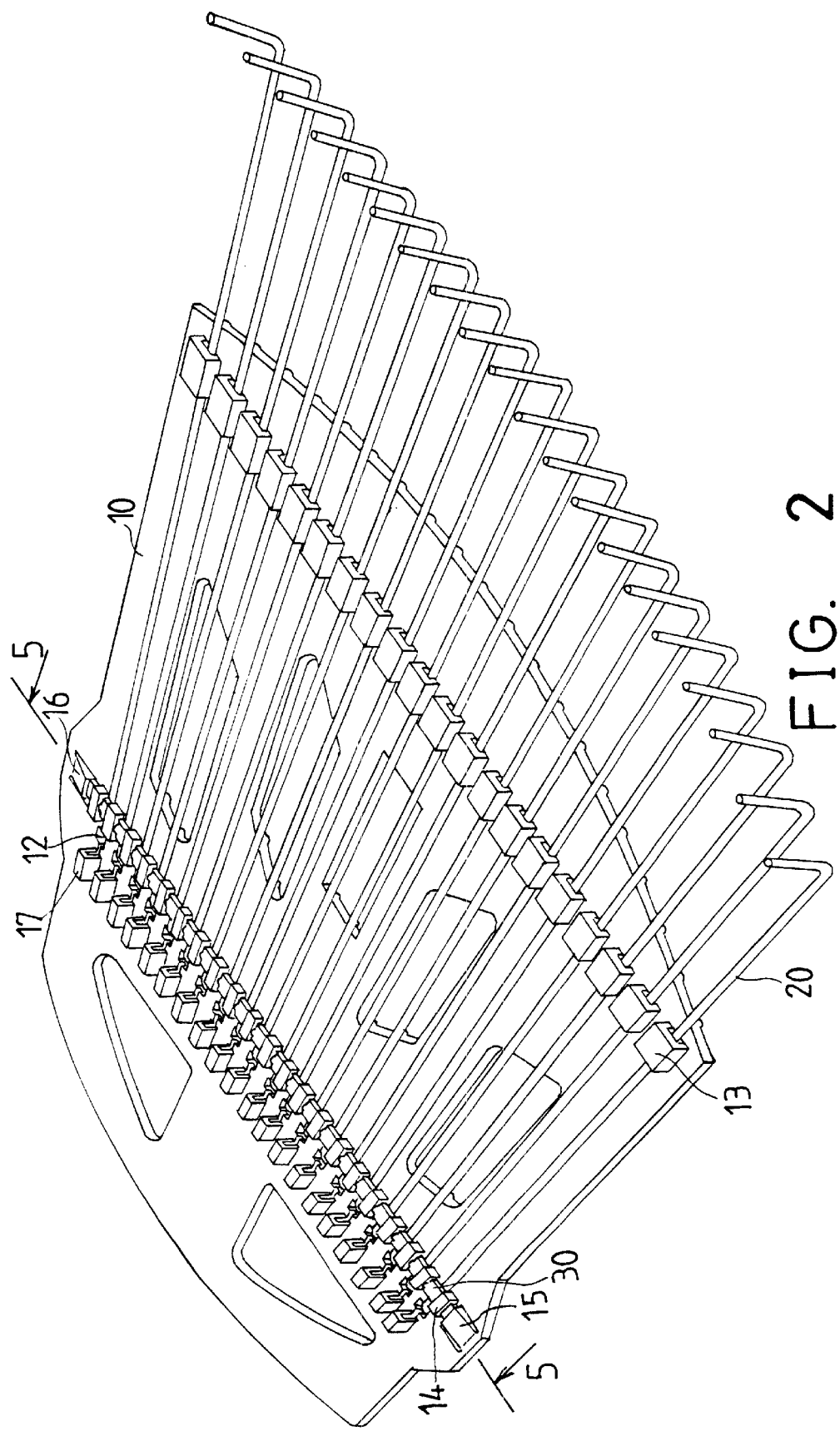
FIG. 2 is a bottom perspective view of the lawn rake.
Figure 3:
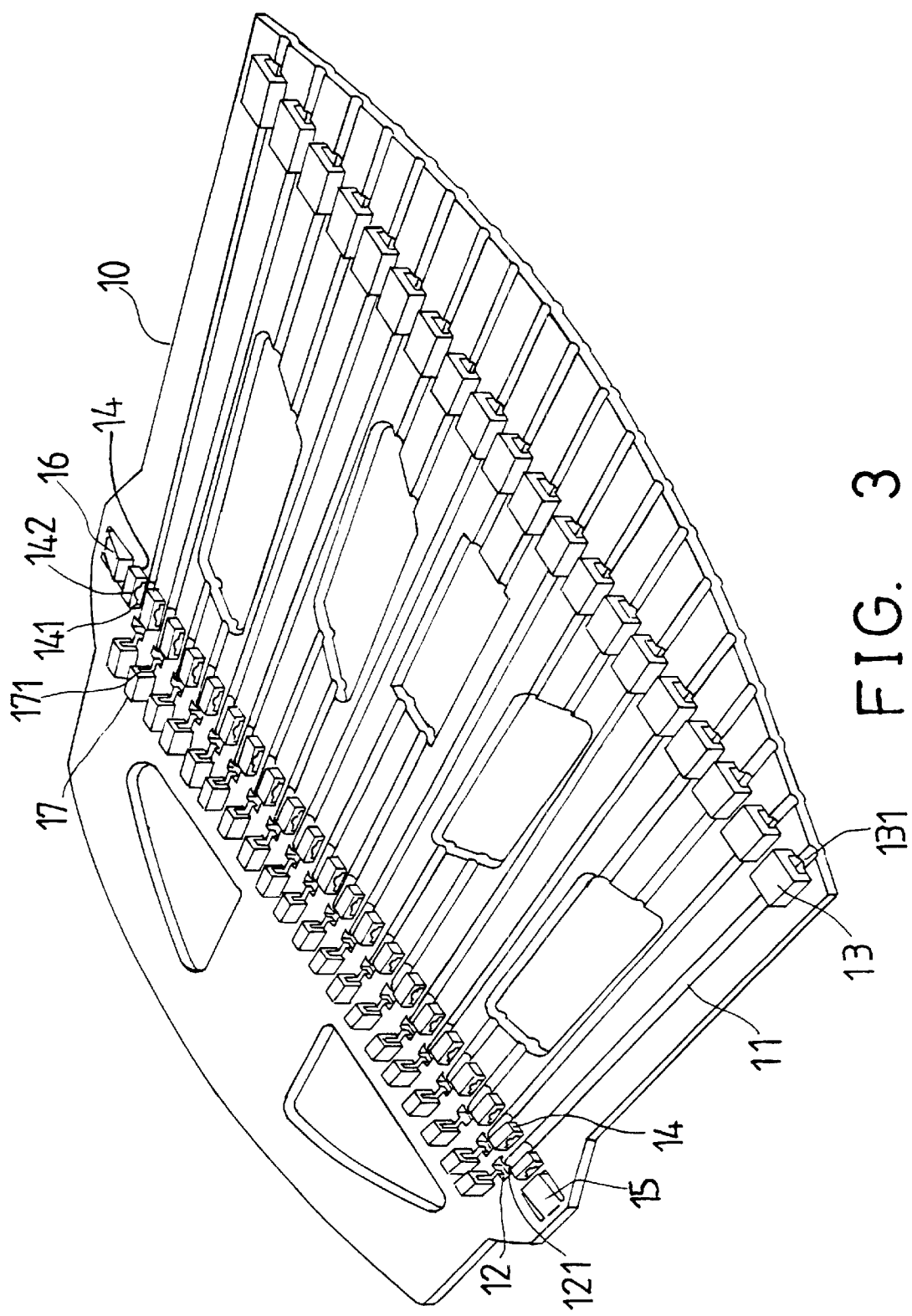
FIG. 3 is a bottom perspective view of a flat rake body of the lawn rake.
Figure 4:
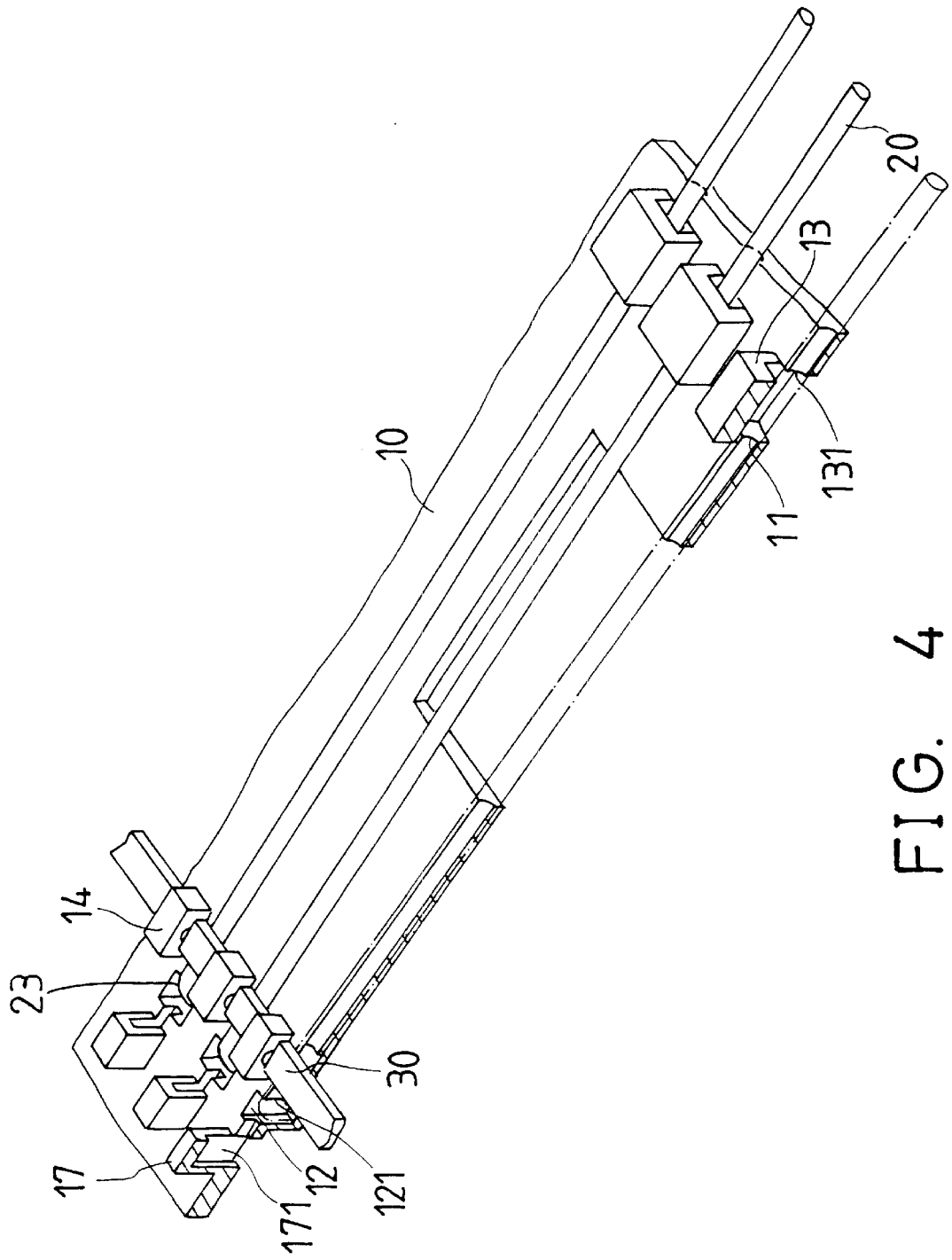
FIG. 4 is a partial bottom perspective view illustrating the attachment of the tines onto the flat rake body of the lawn rake.
Figure 5:
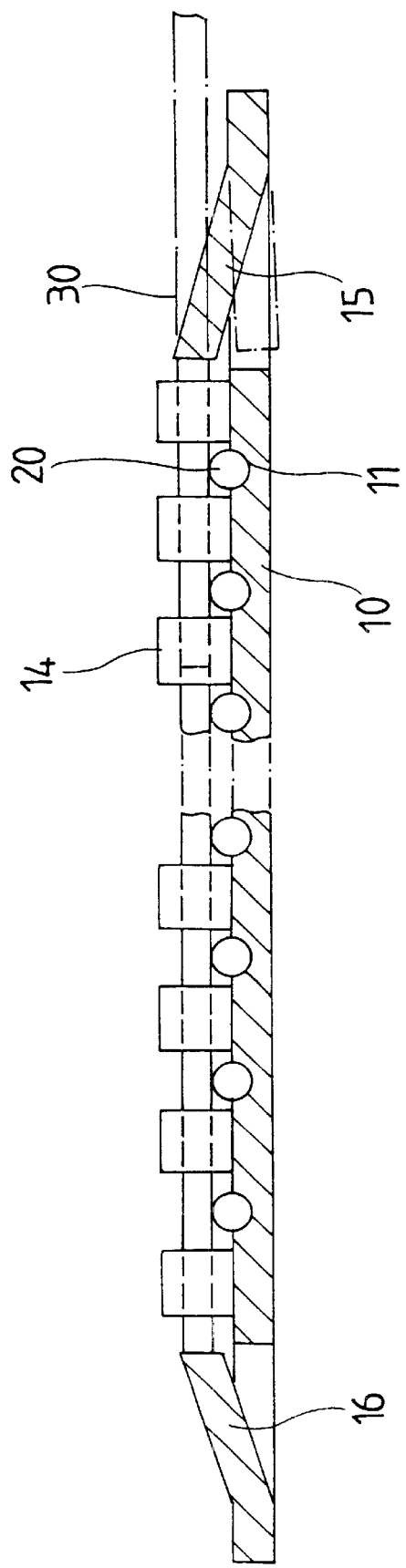
FIG. 5 is a cross sectional view taken along lines 5—5 of FIG. 2.

Referring to the drawings, and initially to FIGS. 1–5, a lawn rake in accordance with the present invention comprises a flat rake body 10, a number of tines 20 received and attached onto the rake body 10, and a handle 70 (FIG. 1) or the like attached to the rake body 10 for operating the rake body 10 and the tines 20. FIG. 1 shows the upper portion of the lawn rake. FIGS. 2 and 3 show the bottom portion of the rake body 10. The flat rake body 10 includes a number of slots 11 formed in the bottom portion thereof and preferably arranged in radially extending status for receiving the tines 20 respectively. Particularly, the slots 11 each includes a semi-circular cross section for receiving the tines 20 having a circular cross section (FIGS. 2, 4, 5, 7).

Figure 6:
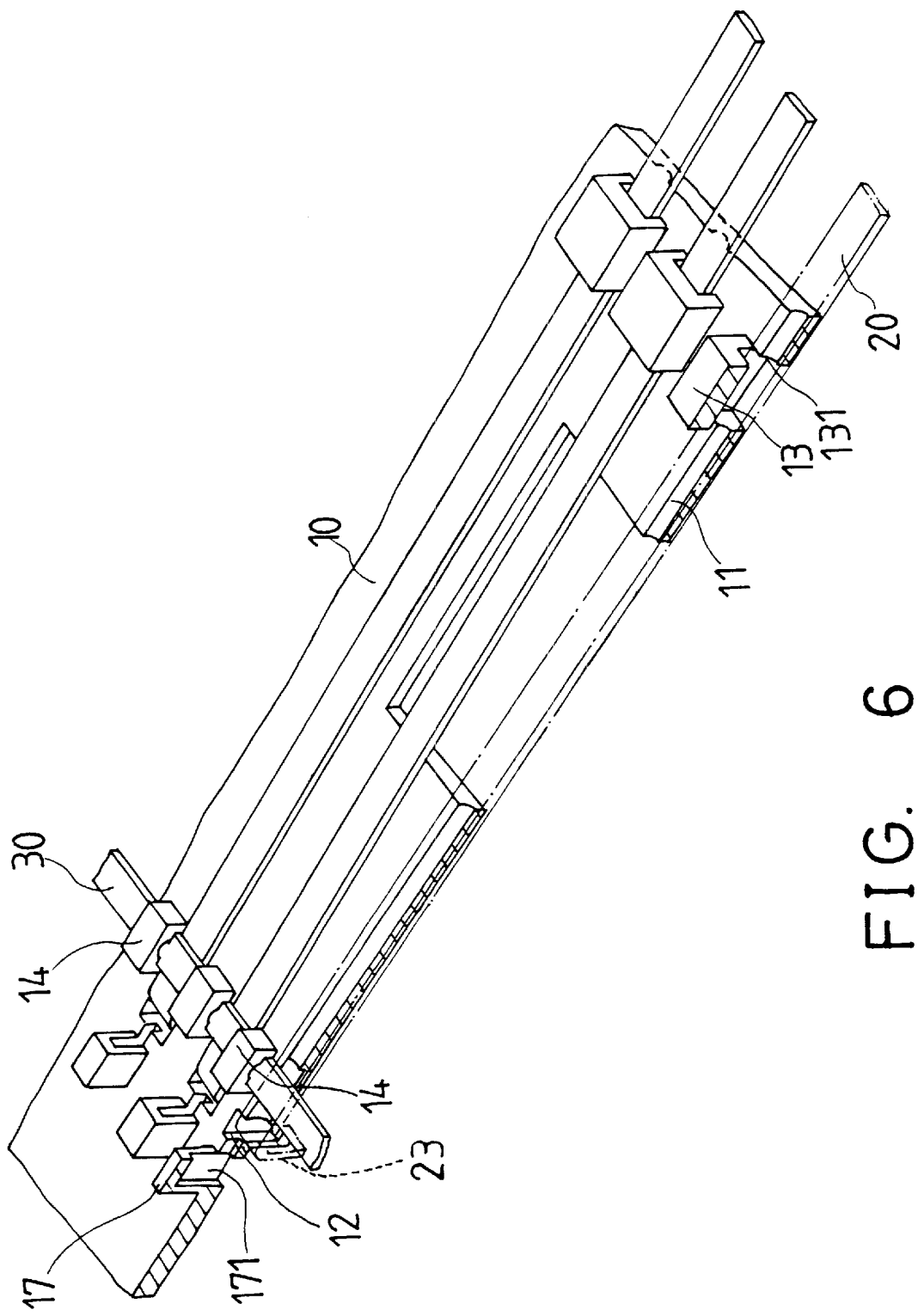
FIGS. 6, 7, 8 are partial bottom perspective views similar to FIG. 4, illustrating the attachment of the other types of shapes of the tines onto the flat rake body of the lawn rake.

The front portion of the bottom of the rake body 10 includes a number of stops 13 straddled over the slots 11 of the rake body 10 respectively and each having an opening 131 formed therein and communicating with the slots 11 of the rake body 10. Or, relatively, the slots 11 of the rake body 10 are formed through the stops 13 respectively and communicating with the opening 131 of the respective stop 13. The openings 131 of the stops 13 include the other cross section, such as the rectangular cross section, different from that of the slots 11 of the rake body 10, for receiving the tines 20 of the other cross section other than circular, such as tines 20 having the rectangular cross section (FIGS. 6, 8).

The middle portion of the bottom of the rake body 10 includes a number of cavities 12 defined by a block 120 respectively (FIGS. 1, 7, 8) for receiving the bent rear end 23 of the tine 20 (FIGS. 4, 6), and includes a number of curved depressions 121 (FIGS. 3, 4) for receiving the curved bent portion formed between the bent rear end 23 and the body of the tine 20. A number of seats 14 are provided on the middle portion of the bottom of the rake body 10, and each includes a rectangular channel 141 formed therein for receiving a rectangular presser bar 30 (FIGS. 2, 4, 6, 7), and each includes a semi-circular orifice 142 formed therein and communicating with the respective rectangular channel 131 thereof for receiving a presser bar 30 having a circular cross section. The seats 14 are shown and provided between the slots 11 of the rake body 10, but, may also be straddled over the slots 11 of the rake body 10 and having the slots 11 of the rake body 10 formed therethrough. The presser bar 30 may be easily and quickly threaded and engaged through the seats 14 and are disposed across the tines 20 and may be engaged with the tines 20 for solidly securing the tines 20 to the rake body 10.

Figure 7:
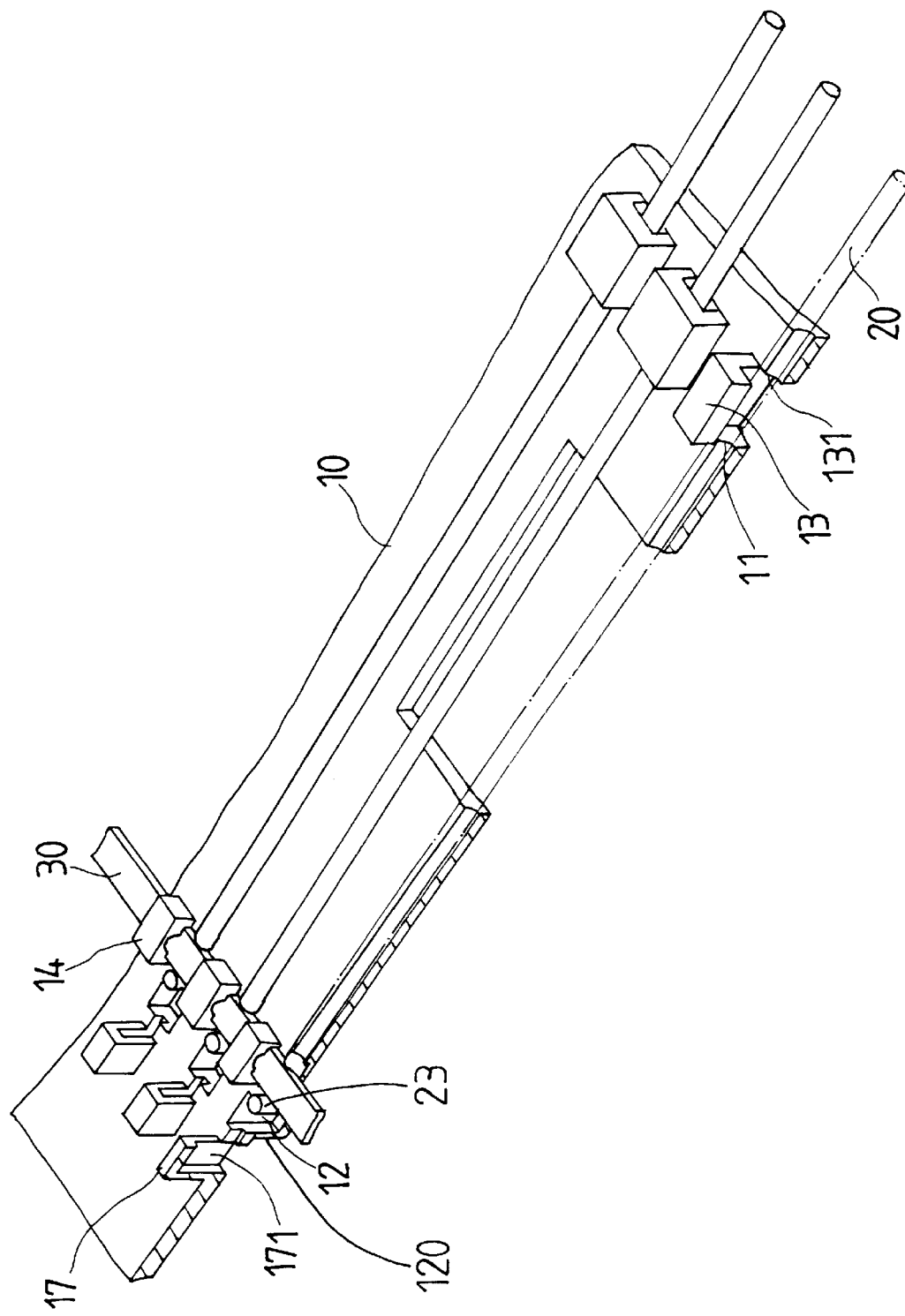

As best shown in FIGS. 1–3 and 5, a pair of spring latches 15, 16 may be formed or punched from the rake body 10 and are provided on both sides of the rake body 10 and disposed beside the seats 14 for engaging with the ends of the presser bar 30 (FIG. 2) and for solidly securing the presser bar 30 to the rake body 10. Either of the spring latches 15, 16 may be depressed inward of the rake body 10 for engaging into or for disengaging the presser bar 30 from the seats 14. As shown in FIG. 7, the tines 20 may include the bent ends 23 thereof extended away from the rake body 10 and engaged with the presser bar 30 which may also be used to solidly secure the tines 20 to the rake body 10.

Figure 8:
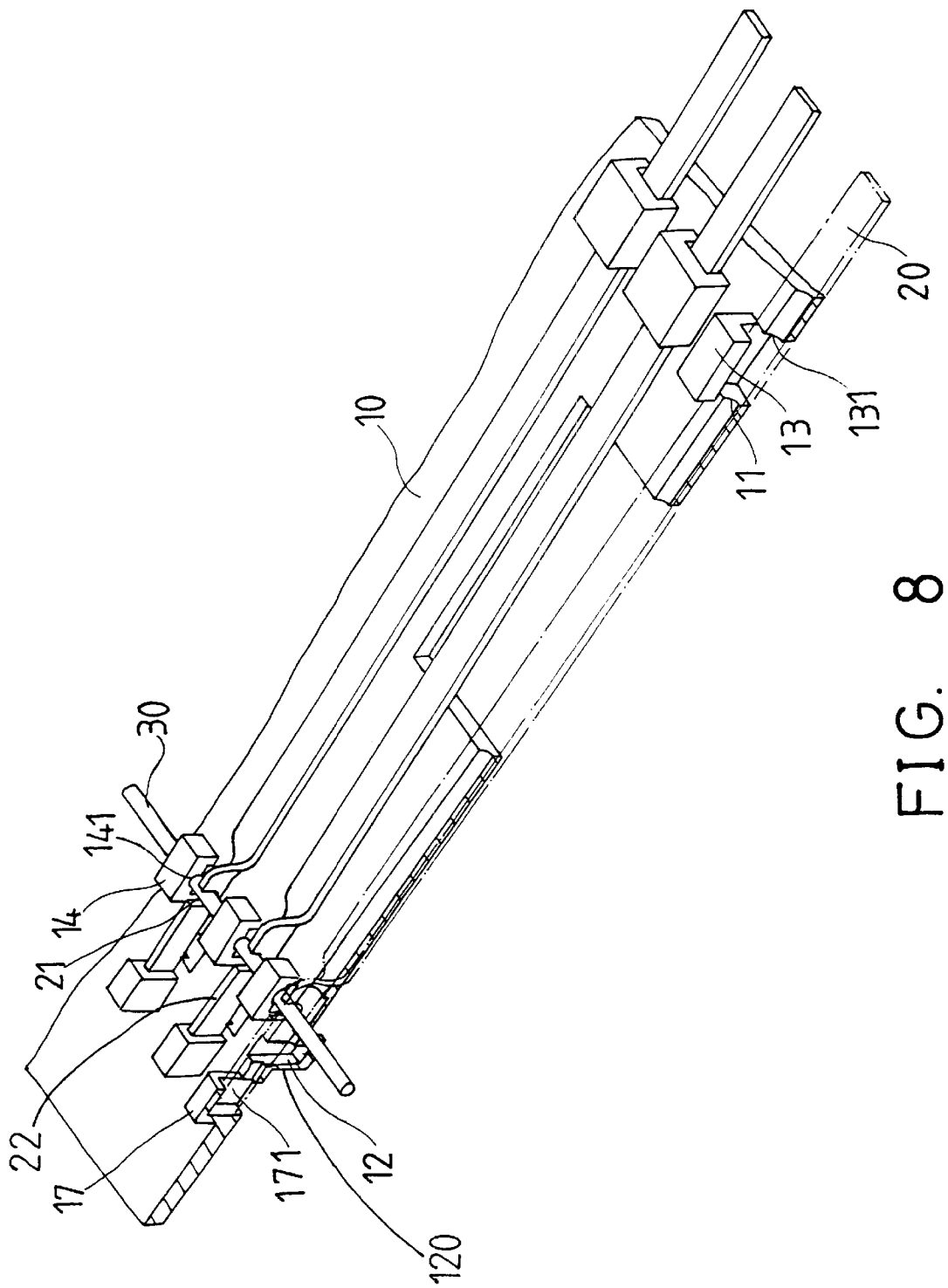

Referring next to FIG. 8, the tines 20 may each include a twisted rear end 22 having a notch 21 formed therein for receiving the presser bar 30 which may also be used to solidly secure the tines 20 to the rake body 10. The middle or the rear portion of the bottom of the rake body 10 includes a number of bulges 17 provided thereon and each having a groove 171 formed therein for receiving the rear ends 22 of the tines 20 and for solidly securing the tines 20 to the rake body 10.

In operation, as shown in FIGS. 4–8, a single presser bar 30 may be easily and quickly threaded through the seats 14 and may be engaged with the tines 20 for solidly securing the tines 20 to the rake body 10. The tines 20 may each include a bent end 23 engaged into the cavities 12 of the rake body 10 or engaged with the presser bar 30 such that the tines 20 may further be solidly retained and secured to the rake body 10. The presser bar 30 may include a circular cross section, a rectangular cross section, or the other cross sections. In addition, the tines 20 of different or various cross sections may be received and secured to the rake body 10. The rake body 10 further includes one or more spring latches 15, 16 for engaging with the presser bar 30 and for solidly securing the presser bar 30 to the rake body 10. The tines 20 may be easily changed or replaced with the other ones when the presser bar 30 is disengaged from the rake body 10.

It is to be noted that the presser bar 30 is shown and engaged with the rear ends of the tines 20; but, may also be engaged with the other portions of the tines 20, such as engaged with the front portions or the middle portions of the tines 20 which includes the other portions engaged into the rake body 10, such that the tines 20 may also be easily and quickly secured onto or disengaged from the rake body 10.

Accordingly, the lawn rake in accordance with the present invention includes a rake body for changeably or replaceably attaching various kinds of tines of different shapes or sizes. In addition, the tines may be easily and quickly secured onto a rake body with a single presser bar.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A lawn rake comprising:
   a) a rake body,
   b) a plurality of tines attached onto said rake body,
   c) a presser bar disposed across said tines for securing said tines to said rake body, said presser bar including two ends, and
   d) securing means for securing said presser bar to said rake body, said securing means including a pair of spring latches engaged with said ends of said presser bar for securing said presser bar to said rake body.

2. The lawn rake according to claim 1, wherein said securing means includes a plurality of seats provided on said rake body, said presser bar is engaged through said seats and secured to said rake body with said seats.

3. The lawn rake according to claim 2, wherein said seats each includes a channel formed therein for receiving said presser bar.

4. The lawn rake according to claim 3, wherein said seats each includes an orifice formed therein and communicating with said channel of said seat for receiving said presser bar.

5. The lawn rake according to claim 2, wherein said seats each includes an orifice formed therein for receiving said presser bar.

6. The lawn rake according to claim 5, wherein said seats each includes a channel formed therein and communicating with said orifice of said seat, for receiving said presser bar.

7. The lawn rake according to claim 1, wherein said rake body includes a plurality of cavities formed therein, said tines each includes a bent end engaged into said cavities of said rake body for being solidly secured to said rake body.

8. The lawn rake according to claim 7, wherein said rake body includes a plurality of blocks formed therein for defining said cavities thereof respectively.

9. The lawn rake according to claim 1, wherein said rake body includes a plurality of stops provided thereon, said tines are engaged through said stops respectively.

10. The lawn rake according to claim 9, wherein said rake body includes a plurality of slots formed therein for receiving said tines, said stops are straddled over said slots of said rake body respectively.

11. The lawn rake according to claim 10, wherein said stops each includes a channel formed therein and communicating with said slot of said rake body respectively.

12. The lawn rake according to claim 1, wherein said rake body includes a plurality of bulges provided thereon and having a groove formed therein, said tines each includes an end portion engaged through said grooves of said bulges respectively, for allowing said tines to be secured to said rake body.

* * * * *